United States Patent [19]

Perkins, III et al.

[11] 4,399,554
[45] Aug. 16, 1983

[54] METHOD AND APPARATUS FOR INSPECTING ENGINE HEAD VALVE RETAINER ASSEMBLIES FOR MISSING KEYS

[75] Inventors: Walton A. Perkins, III, Troy; Lothar Rossol, Rochester; Robert Dewar, Troy; James K. West, Auburn Heights, all of Mich.

[73] Assignee: General Motors Corporation, Detroit, Mich.

[21] Appl. No.: 180,131

[22] Filed: Aug. 21, 1980

[51] Int. Cl.$^3$ .............................................. G06K 9/00
[52] U.S. Cl. ...................................... 382/8; 356/376; 356/237; 358/101; 382/22; 382/42; 382/55
[58] Field of Search .......... 340/146.3 AC, 146.3 ED; 358/96, 101, 106, 107; 364/474, 472, 468, 515; 356/237, 241, 376, 378, 379, 384, 387; 33/DIG. 3; 382/8, 22, 42, 55

[56] References Cited

U.S. PATENT DOCUMENTS 4,146,924 3/1979 Birk et al. ........................... 364/515
4,296,474 10/1981 Hurt ................................... 364/474

OTHER PUBLICATIONS

Branaman, "Recent Applications of Electronic Vision to Noncontact Automatic Inspection", *Proc. of the S.P.I.E.*, vol. 182, Apr., 1979, pp. 102-107.
Sumida et al., "Industrial Visual System by a Symmetry Operator", *Proc. of the S.P.I.E.*, vol. 182, Apr., 1979, pp. 22-29.
Milgram, "Edge Linking Using Thresholding", *Proc. of the S.P.I.E.*, vol. 205, Aug., 1979, pp. 139-144.
Olsztyn et al., "An Application of Computer Vision to a Simulated Assembly Task", *Proc. of the First Int. Joint Conf. on Pattern Rec.*, 1973, pp. 505-513.

*Primary Examiner*—Leo H. Boudreau
*Attorney, Agent, or Firm*—Albert F. Duke

[57] ABSTRACT

A computer vision system for inspecting engine heads during assembly for missing valve spring assembly keys comprises a solid-state camera for taking pictures of the valve spring assemblies and providing picture data upon command to a computer. The computer responds to a position encoder which relates the position of the engine head to the camera. Once the data is stored in the computer, it is analyzed to determine the center of the digitized image of the valve spring assembly and an intensity profile at the expected location of the keys relative to the center of the assembly is utilized to determine whether a key is missing.

6 Claims, 13 Drawing Figures

METHOD AND APPARATUS FOR INSPECTING ENGINE HEAD VALVE RETAINER ASSEMBLIES FOR MISSING KEYS

FIELD OF THE INVENTION

This invention relates to a method and apparatus for automatically inspecting valve spring assemblies on engine heads and, more particularly, to inspecting such assemblies for the presence of both valve spring cap keys during the engine assembly process.

BACKGROUND OF THE INVENTION

A V-8 engine has two engine heads and eight valve spring assemblies per head. The valve spring assemblies comprise a valve, spring, spring retainer and two half rings called keys. To insert the valve spring assemblies into the engine head, the spring must be compressed so that the keys can be placed around the valve stem notch. When the spring is released, the keys are firmly held in place. If one key should pop out as the spring is released, the other key will temporarily hold the assembly together. Because of human errors, the manual inspection operation performed after engine head assembly is less than perfect, and some percentage of the assembled engines do not contain both keys on each of the potentially eight valve spring assemblies of an engine head. Missing valve retainer keys can cause production delays and increase cost if they are discovered late in the assembly stage or during the engine testing phase. If they are not detected at all, the missing keys can lead to serious engine damage in the field.

SUMMARY OF THE INVENTION

With the foregoing in mind, it is an object of the present invention to provide a computer vision method and apparatus for automatically inspecting engine heads for missing valve retainer keys.

A number of problems arise in attempting to automatically inspect valve spring assemblies utilizing computer vision techniques. During assembly of an engine head, a shuttle conveyor transfers the head between stations along the assembly line in approximately one second. The engine remains at each station for an eight second dwell time while assembly operations are performed. Some variations exist in the locations of the valve spring assemblies of different engine heads and in the absolute location of the engine head along the assembly line. Accordingly, a determination of the location of the center of the assembly is necessary before an inspection for missing keys can be made. Furthermore, there are significant variations in the reflectances of different valve assemblies and the intensity distribution of typical assemblies is not bi-modal. For these reasons, thresholding techniques are not very useful in separating regions of the image or in locating the center of the assembly in the image.

In accordance with the present invention, a computer vision system for inspecting valve spring assemblies is provided which is capable of inspecting for missing keys within the nine second cycle time of the existing engine head conveyor. The inspection for missing keys is based on the observation that the keys are always brighter than the hole which results when a key is missing and from the further observation that typical valve spring assembly images subjected to an edge operation show strong circular patterns which permit a determination of the center of the assembly by a convolution technique. Thus, by examining the intensity profile of the digitized image along the circumference of a circle of predetermined radius originating at the center of the assembly, a missing key may be detected. The system includes a computer which monitors the position of the engine head conveyor and inputs data from a solid state camera representing a digitized image of each valve spring assembly as the engine head passes the camera. The computer is programmed to utilize the intensity data provided by the camera to construct an edge array which is convolved with itself to locate the center of the assembly in the digitized image. After the center is located, on analysis of the intensity profile along the circumference of a circle of known radius is performed to determine if a key is missing. If a missing valve retainer key is detected, the engine head is removed from the conveyor prior to further assembly operations.

A more complete understanding of the present invention may be had from the following detailed description which should be read in conjunction with the drawings, in which:

DESCRIPTION OF THE PREFERRED EMBODIMENT

Figure 1A:
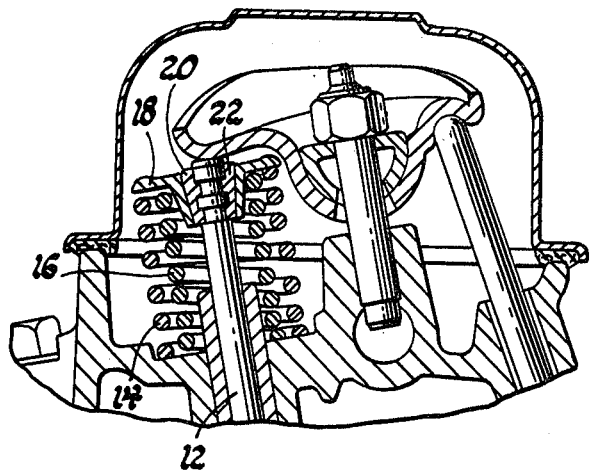
FIGS. 1a and 1b are sectional and top views, respectively, of a typical valve spring assembly.
Figure 1B:
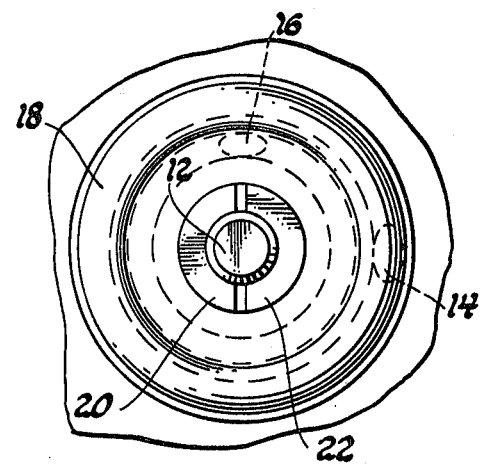

Referring now to the drawings and initially to FIGS. 1a and 1b, a conventional valve spring assembly comprises a valve (not shown) attached to a valve stem 12 which is biased in one direction by springs 14 and 16. One end of the springs 14 and 16 engage a valve spring retainer 18 which is coupled to the stem 12 by two keys 20 and 22 which have a projection engaging a corresponding notch in the stem 12.

Figure 2:
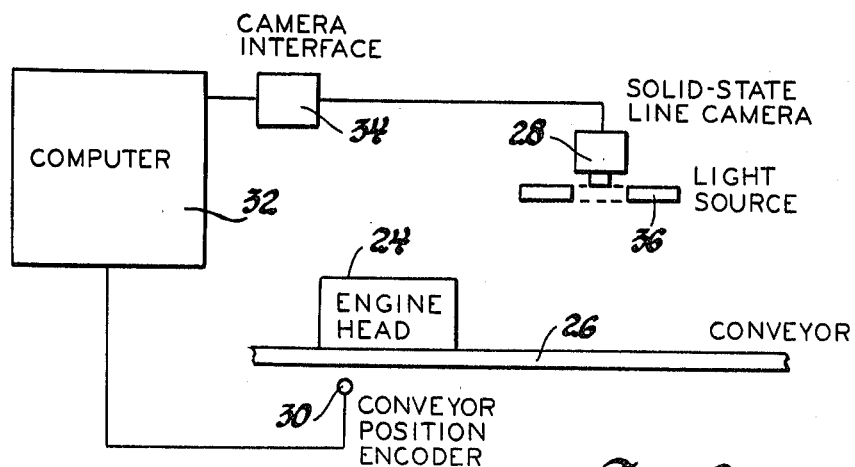
FIG. 2 is a block diagram of the apparatus of the present invention.

Referring now to FIG. 2, an engine head generally indicated by the numeral 24 contains a plurality of valve spring assemblies and is mounted on a conveyor 26 which moves the head 24 past a 64-element solid-state line camera 28. A conveyor position encoder 30 is attached directly to the conveyor or geared to the conveyor drive mechanism to keep track of the conveyor's position. Each time the conveyor 26 has moved a small increment of distance, the encoder 30 emits a pulse. The accumulation of these pulses permits identification of the conveyor position. Since the engine head is located fairly precisely on the conveyor and the locations of the valve spring assemblies on the head are known within a certain tolerance, the encoder output provides a source for locating the spring assemblies relative to the camera 28. A computer 32, such as the PDP 11/34, is responsive to the output of the encoder 30 and through an interface 34 inputs data from the camera 28 corresponding to 64-line pictures of each valve spring assembly as it passes through the field of view of the camera 28. The valve spring assembly is illuminated by a light source 36. The camera 28 is free-running but the picture data is input to the computer 32 only upon a command which is based on position of the engine head as input from the encoder 30. Once a region of the assembly, just slightly larger than the key area, enters the field of view of the camera, data corresponding to 64-line pictures, each picture containing 64 intensity values, is sequentially input and stored in a 64×64 memory array of the computer 32. After complete pictures for eight valve spring assemblies have been taken and stored in the computer memory, the data is analyzed by the computer 32 to determine whether a valve retainer key is missing from any one of the eight assemblies of the engine head. The analysis is made during the eight second interval that the head is at the next assembly station.

Figures 3, 5:
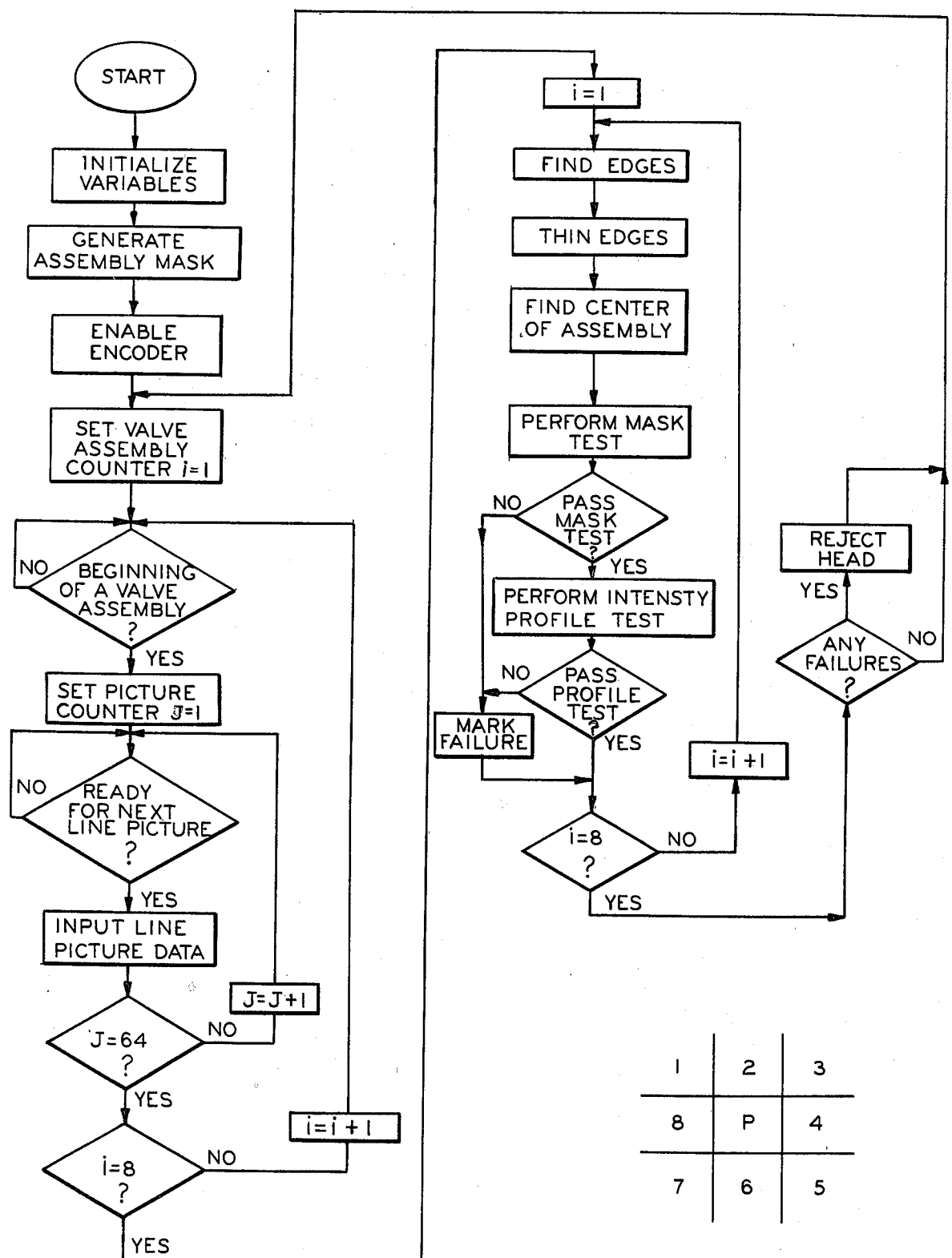
FIG. 3 is an overall flow chart of the inspection system operation.
FIG. 5 shows a pixel neighborhood useful in describing the edge finding operation.
Figure 4A:
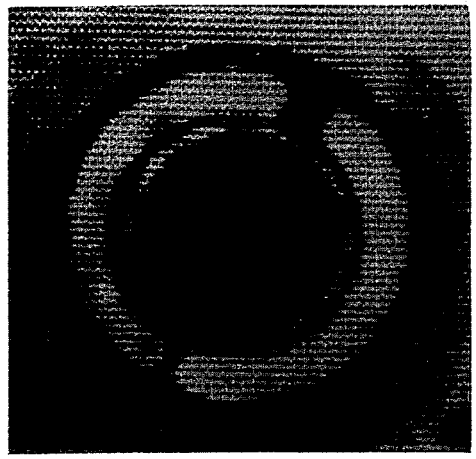
FIGS. 4a–4d are digitized pictures of a portion of a valve spring assembly representing gray scale data, edge magnitude data, thresholded thinned edge data and edge mask data respectively.
Figure 4B:
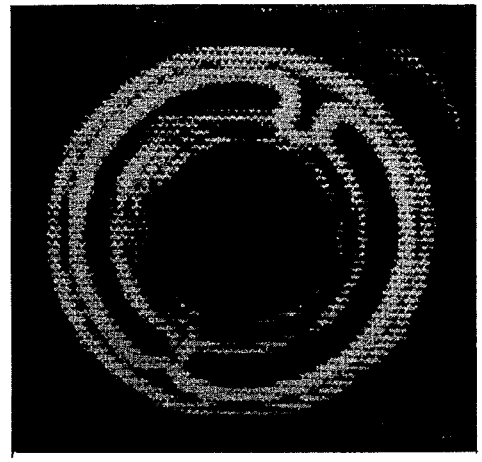

A flow chart of the overall system operation is shown in FIG. 3. Once the 64×64 intensity array for each valve assembly (eight for the example shown) resides in the computer memory each array is processed in sequence. A digitized picture of a region of a typical valve spring assembly, just slightly larger than the key area with 16 gray levels, is shown in FIG. 4a. An edge operation is applied to every pixel in the gray level picture to identify pixels between regions of different light intensity "I". With reference to FIG. 5, the gradient or edge magnitude "D" at point "P" is calculated using the Sobel edge operator except that the usual square root operation is approximated by a faster absolute value operation. Thus, $$D = |D_X| + |D_Y|$$

where
$D_X = I_1 + 2I_8 + I_7 - I_3 - 2I_4 - I_5$
$D_Y = I_1 + 2I_2 + I_3 - I_5 - 2I_6 - I_7$ FIG. 4b, showing the edge magnitude, was obtained by applying the edge operation to every pixel of the gray level picture. After the edge operation, a thinning or non-maximum suppression operation is applied to every pixel. In the thinning operation, each pixel is separated into two classes—horizontal or vertical—depending upon whether $|D_X|$ or $|D_Y|$ is larger. If an edge pixel is horizontal, its two neighbors (above and below) are compared with it. If the edge magnitude at the pixel is smaller than that of either neighbor and that neighbor is also horizontal, the edge magnitude is set to zero. For vertical pixels, the two neighbors (left and right) are compared with it and a similar adjustment is made. The results of the thinning operation is stored in a different working array.

The thinned edge data is then subjected to a thresholding operation, which identifies those pixels that are edge pixels as ones having an edge magnitude greater than a predetermined fixed threshold. The use of a fixed edge threshold has produced satisfactory results and reduces processing time. If desired, however, a threshold could be calculated from the thinned edge distribution or the convolution method could be modified to work with non-binary data.

Figure 4C:
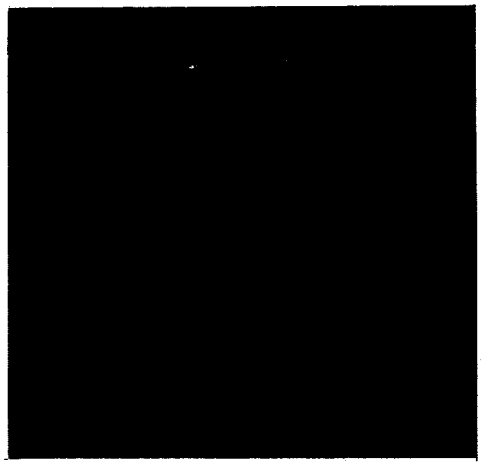
Figure 6A:
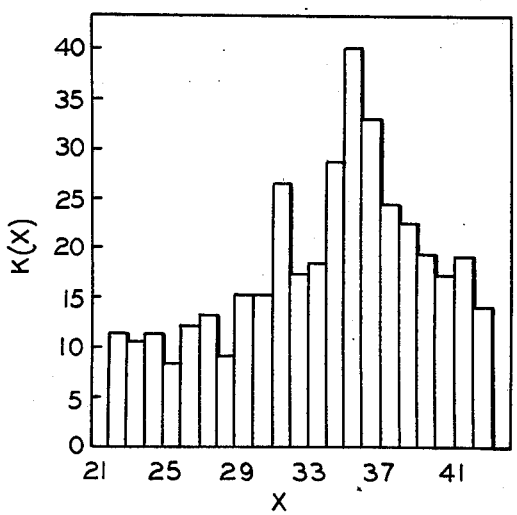
FIGS. 6a and 6b show the results of applying a convolution process to an image edge array to locate the axes of symmetry of the array.
Figure 6B:
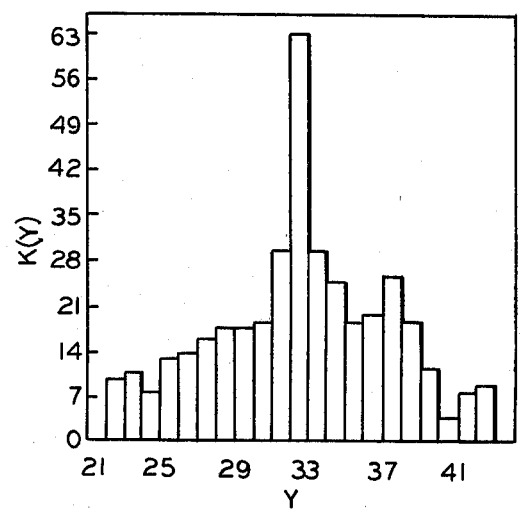

Applying a fixed threshold to the thinned edge array results in a binary array identifying the the edge pixels of the digitized image as shown in FIG. 4c. The center of symmetry of the array of edge pixels is the intersection of the vertical and horizontal axes of symmetry of the array. These axes are determined by convolving the edge pixels on the left with those on the right for each of a plurality of vertical axes and convolving the edge pixels above with those below for each of a plurality of horizontal axes. The convolution process involves counting the number of pairs of edge points which are equidistant from a potential axis of symmetry. The results of a convolution of a typical edge pixel array for X and Y values within ten pixels of the expected center are shown in FIGS. 6a and 6b. The maximum number of pairs, K(X), occurs at the vertical axis X=35 and K(Y) at the horizontal axis Y=32.

Figure 4D:
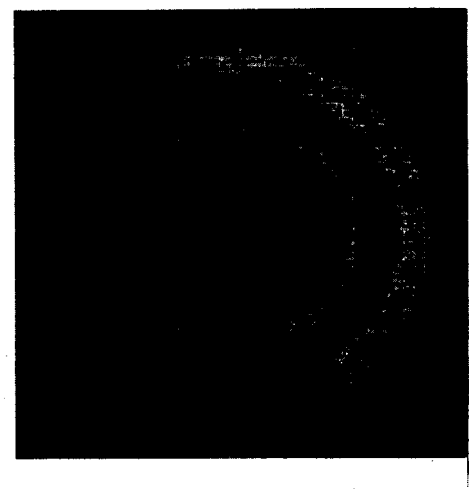

Since the convolution of data will result in a center location for any input data, it is desirable to verify that the center of the assembly has been found. The verification involves translating the center of a model edge mask such as shown in FIG. 4d into coincidence with the center of the assembly as determined during the convolution of the edge array. If a good fit is not obtained, the verification test fails. The "goodness" of the fit is simply the total number of mask and image edge points that have the same pixel location.

Figure 7A:
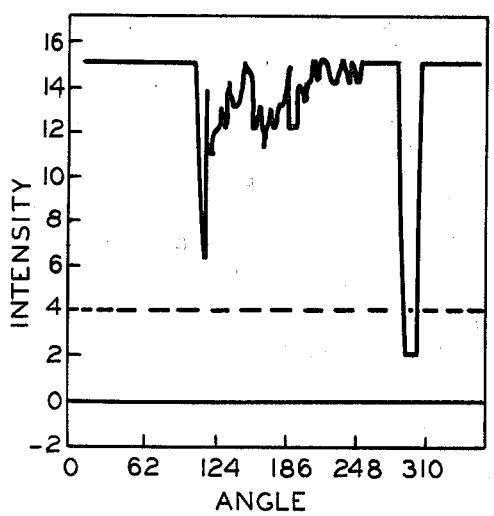
FIGS. 7a and 7b are intensity profiles along a circle of predetermined radius from the center of an assembly having both keys present (7a) and of an assembly having one key missing (7b).
Figure 7B:
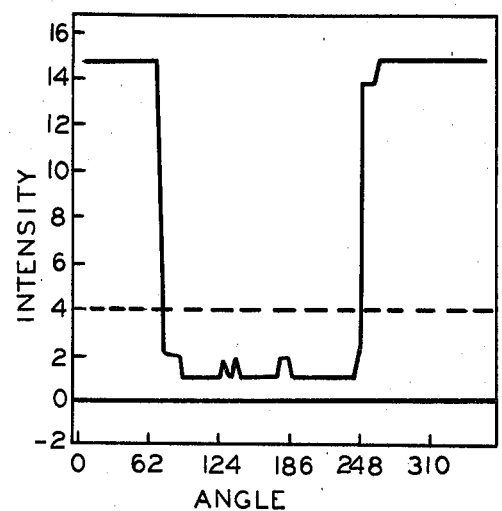

Once the center of a verified edge array has been determined, a profile of the intensity array through the center of key location is analyzed. The location of the keys relative to the center of the assembly is known so that the analysis involves a consideration of the intensity values at pixel locations on the circumference of a circle of known radius from the center of the assembly obtained from the convolution operation. The intensity profile for an image with both keys present is shown in FIG. 7a, and with one key missing in FIG. 7b. The profile is analyzed by determining the percentage of pixels with intensity values greater than a fixed threshold equal to 4, as shown by dotted lines in FIGS. 7a and 7b. For a value spring assembly to pass the inspection, the percentage of bright pixels must be greater than $B_{MIN}$ and less than $B_{MAX}$. Satisfactory results are obtained when $B_{MIN}$ equals 82% and $B_{MAX}$ equals 99%.

If any of the eight valve assemblies are missing a key, the computer notifies a rejection device and the head is rejected. As a further safeguard, an overall check of all assembly centers may be made to ensure that they are consistent with the head geometry. This can be accomplished by fitting a straight line to the eight assembly centers and rejecting the head if any assembly center is too far from the line. A test for deviations along the direction of motion may be made, if desired, by comparing assembly center positions with the median assembly center position.

The embodiments of the invention in which an exclusive property or privilege is claimed are defined as follows:

1. Apparatus for automatically inspecting a valve spring assembly of an engine head to determine whether both keys of the assembly are present, said apparatus comprising camera means, computer means for controlling said camera means to obtain a digitized image of the valve spring assembly, said computer means being programmed to locate the center of the assembly and to determine whether both keys of said assembly are present based on the intensity profile of the digitized image along the circumference of a circle of predetermined radius originating at said center.

2. Apparatus for automatically inspecting a valve spring assembly of an engine head to determine whether both keys of the assembly are present, said apparatus comprising camera means, conveyor means for moving said engine head past said camera means, means for monitoring the position of said engine head relative to said camera means, computer means responsive to said monitoring means for controlling said camera means to obtain a digitized image of the valve spring assembly, said computer means being programmed to locate the center of symmetry of the digitized image and to determine whether both keys of said assembly are present based on the intensity profile of the digitized image along the circumference of a circle of predetermined radius originating at said center.

3. Apparatus for automatically inspecting a valve spring assembly of an engine head to determine whether both valve spring cap keys are present, said apparatus comprising camera means, conveyor means for moving said engine headpast said camera means, means for monitoring the position of said engine head relative to said camera means, computer means responsive to said monitoring means for controlling said camera means to obtain a digitized image of a portion of the valve spring assembly as represented by a two dimensional array of pixel light intensity values, said computer being programmed to
  (a) construct an edge pixel array of binary values from said array of pixel light intensity values,
  (b) identify the center of symmetry of the array of edge pixels,
  (c) count the number of pixels located at a predetermined radius from the center of symmetry of the edge pixel array which have a light intensity value which is greater than a predetermined threshold, and
  (d) indicate whether both keys of the assembly are present based on the value of the count.

4. A machine implemented method of processing a digitized image of a valve spring assembly of an engine head, the image being represented by a two dimensional array of pixel light intensity values; the method comprising the steps of:
  (a) constructing an edge pixel array of binary values from said array of pixel light intensity values,
  (b) identifying the center of symmetry of the array of edge pixels; and
  (c) determining the percent of those pixels located at a predetermined radius from the center of symmetry of the edge pixel array which have a light intensity value which is greater than a predetermined threshold to determine whether both keys of the valve spring assembly are present.

5. A machine implemented method of processing digitized image of a portion of an engine head, the image being represented by a two dimensional array of pixel light intensity values; the method comprising the steps of:
  (a) calculating the edge strength at each pixel of the array, comparing the horizontal and vertical components of the edge strength to determine whether the predominate direction is horizontal or vertical, and identifying edge pixels as those having an edge strength which is greater than or equal to the edge strength of a similarly directed pixel in adjacent rows if the pixel has a predominate horizontal direction and in adjacent columns if the pixel has a predominate vertical direction;
  (b) convolving the edge pixels on the left with those on the right for each of a plurality of vertical axes to determine the vertical axis of symmetry, convolving the edge pixels above with those below for each of a plurality of horizontal axes to determine the horizontal axis of symmetry, and determining the center of symmetry of the array of edge pixels from the intersection of the two axes of symmetry;
  (c) aligning the centers of symmetry of the edge pixel array with a model edge array and determining if there is a predetermined number of corresponding located edge pixels to verify that the center of symmetry of the edge pixel array is the center of a digitized image of a valve spring assembly; and
  (d) counting the number of pixels located at a predetermined radius from the center of symmetry of the edge pixel array which have a light intensity value which is greater than a predetermined threshold to determine whether both keys of the valve assembly are present.

6. A machine implemented method of processing a digitized image of a portion of an engine head to determine whether both keys of a valve spring assembly of the engine head are present, the image being represented by a two dimensional array of pixel light intensity values; the method comprising the steps of:
  (a) calculating the horizontal and vertical components of the edge strength at each pixel of the array, summing the absolute values of the components to obtain an edge strength, comparing the horizontal and vertical components of the pixel edge strength to determine whether the predominate direction is horizontal or vertical, and identifying edge pixels as those having an edge strength which is greater than or equal to the edge strength of a similarly directed pixel in adjacent rows if the pixel has a predominate horizontal direction and in adjacent columns if the pixel has a predominate vertical direction;
  (b) convolving the edge pixels on the left with those on the right for each of a plurality of vertical axes to determine the vertical axis of symmetry, convolving the edge pixels above with those below for each of a plurality of horizontal axes to determine the horizontal axis of symmetry, and determining the center of symmetry of the array of edge pixels from intersection of the two axes of symmetry;
  (c) aligning the centers of symmetry of the edge pixel array with a model edge array and determining if there is a predetermined number of correspondingly located edge pixels to verify that the center of symmetry of the edge pixel array is the center of a digitized image of a valve spring assembly; and
  (d) counting the number of pixels located at a predetermined radius from the center of symmetry of the edge pixel array which have a light intensity value which is greater than a predetermined threshold and indicating that the assembly has both keys if the count is greater than a predetermined count.

* * * * *